(12) United States Patent
Yang (10) Patent No.: US 7,912,114 B2
(45) Date of Patent: Mar. 22, 2011

(54) MEANS FOR LOW PROBABILITY OF INTERCEPTION/DETECTION UNDERWATER ACOUSTIC COMMUNICATIONS

(75) Inventor: Tsih C Yang, Great Falls, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 563 days.

(21) Appl. No.: 12/051,011

(22) Filed: Mar. 19, 2008

(65) Prior Publication Data

US 2008/0232434 A1 Sep. 25, 2008

Related U.S. Application Data

(60) Provisional application No. 60/896,110, filed on Mar. 21, 2007.

(51) Int. Cl.
H04B 1/00 (2006.01)
(52) U.S. Cl. ......... 375/147; 375/148; 375/150; 375/152
(58) Field of Classification Search .................. 375/130, 375/136–137, 140–144, 147–150, 279, 283, 375/285, 316, 323–324, 329, 330, 340, 343, 375/346, 349, 152; 367/97, 135, 141, 149, 367/178; 340/855.4–855.7
See application file for complete search history.

(56) References Cited

U.S. PATENT DOCUMENTS

| | | | | |
|---|---|---|---|---|
| 5,784,403 A | * | 7/1998 | Scott | 375/151 |
| 6,014,405 A | * | 1/2000 | Garodnick et al. | 375/148 |
| 6,510,186 B1 | * | 1/2003 | Chen et al. | 375/343 |
| 7,386,035 B2 | * | 6/2008 | Hwang et al. | 375/148 |
| 2006/0209922 A1 | * | 9/2006 | Sahinoglu et al. | 375/130 |

OTHER PUBLICATIONS

Hermand., Model-based Matched filter Processing for Delay-Doppler Measurement in a Multipath Dispersive Ocean Channel, 1993, OCEANS '93. Engineering in Harmony with Ocean. Proceedings, vol. 1, pp. 1306-1311.*

Hermand et al., Acoustic Model-Based Matched Filter Processing For Fading Time-Dispersive Ocean Channels: Theory and Experiment, 1993, Oceanic Engineering, IEEE Journal of, vol. 18, Issue 4, pp. 447-465.*

Stojanovic, M and Freitag, L. "Hyothesis-Feedback Equalization for Direct-Swquence Spread-Spectrum Underwater Communications", Proc. MTS/Ieee Oceans '00, vol. 1, 123-129 (2000).

(Continued)

Primary Examiner — Tesfaldet Bocure
Assistant Examiner — Lawrence B Williams
(74) Attorney, Agent, or Firm — Amy L. Ressing; Suresh Koshy (57) ABSTRACT

A direct-sequence spread-spectrum communications method of de-spreading and decoding received data transmitted through an acoustic channel. A first code match filter is applied to receive data to output a first code impulse response comprising a channel impulse response modulated by a pseudo-random number bit. A second code match filter is applied to the received data to output a second code impulse response comprising the channel impulse response modulated by a message symbol bit. The first code impulse response is correlated with the second code impulse response to output the message symbol bit modulated by the pseudo-random number bit. The pseudo-random number bit is eliminated to identify the message symbol bit, thereby decoding the message symbol bit from the received data.

5 Claims, 12 Drawing Sheets

OTHER PUBLICATIONS

Blackmon, F and Sozer, E. M. and Stojanovic, M. and Proakis, J. "Performance Comparison of Rake and Hypothesis Feedback Direct Sequenc Spread Spectrum Techniques for Underwater Communication applications", Proc. MTS/Ieee Oceans '02, vol. 1, 594-603 (2002).

Rouseff, D. Jackson, D. R. Fox, W. L. J. Jones, C. D. Ritcey, J. A. and Dowling, D. R. "Underwater acoustic communication by passive-phase conjugation: Theory and experimental results," J. Oceanic Eng. 26, 821-831 (2001).

* cited by examiner

MEANS FOR LOW PROBABILITY OF INTERCEPTION/DETECTION UNDERWATER ACOUSTIC COMMUNICATIONS

PRIORITY CLAIMS AND REFERENCE TO RELATED APPLICATIONS

This non-provisional patent application claims priority to U.S. Provisional Patent Application Ser. No. 60/896,110, filed 21 Mar. 2007, entitled "SYSTEM AND METHOD FOR LOW PROBABILITY OF INTERCEPTION/DETECTION UNDERWATER ACOUSTIC COMMUNICATIONS," which provisional is incorporated herein by incorporated herein by reference.

BACKGROUND OF THE INVENTION

1. Field of the Invention

This invention relates in general to a method of direct-sequence spread-spectrum communications, and in particular to a method of direct-sequence spread-spectrum communications addressing inter-chip and/or inter-symbol interferences due to multi-path arrivals in an acoustic channel.

2. Description of the Related Art

Underwater acoustic communications are band-limited due to the increased attenuation at higher frequencies. Phase coherent underwater acoustic communications provide an efficient use of the limited bandwidth and have received a great deal of attention recently. Direct-sequence spread-spectrum ("DSSS") signaling uses phase coherent signals, where the information symbols are coded/multiplied with a code sequence, commonly known as chips. The signals are processed at the receiver using the code sequence as a matched filter to extract the information symbols. Two advantages of DSSS signals are: (1) multiple access communications between the different users using different code sequences which are almost orthogonal to each other, and (2) communications at low signal levels (e.g., below the noise level) to avoid detection and interception by an unfriendly party. For the former, the focus is on the separation of messages (i.e., interference suppression) using code orthogonality. For the latter, the focus is on the signal enhancement for the intended receiver using the processing gain of the matched filter.

The problem for DSSS communications in an underwater acoustic channel is the multipath arrivals which create severe inter-chip and inter-symbol interferences. As the decision to feedback equalizer ("DFE") has been successfully applied to phase coherent signals, the same approach has been adapted for DSSS communications. To achieve precise symbol synchronization and channel equalization, high signal-to-noise ratio ("SNR") signals are required. Similarly, a RAKE receiver has been applied to differentially coherent signals when multipath arrivals have been identified. A coherent RAKE receiver has been coupled with an extended Kalman-filter based estimator for the channel parameters. Such approaches have not addressed the difficulty of acquisition/tracking for real data at low input-SNRs since the accuracy of symbol synchronization degrades significantly with decreasing SNR.

The interest in low-input-SNR acoustic communications lies in some practical applications. Acoustic signals much weaker than the ambient noise (e.g., −8 dB SNR within the signal band) are difficult to detect by an un-alerted listener. Noise-like signals are difficult to decode without a prior knowledge of the structure of the signal. Communications with low-input-SNR signals at the receiver are said to provide a low probability of interception ("LPI") and low probability of detection ("LPD"). The probabilities of detection and interception are a function of the input-SNR. Naturally, when the interceptor is close to the transmitter, the communication may no longer be LPI/LPD due to the increasing SNR.

To be able to decode symbols from low-input-SNR signals, the symbol energy must be brought above the noise by signal processing. The ratio of the output symbol SNR over the input-SNR is called the processing gain ("PG"). Using the DSSS method, the received data are de-spread by a correlator (e.g., a matched filter), which correlates the received data with the transmitted code sequence. The de-spreading provides a matched filter gain ("MFG") for the signal, equal, in theory, to the time-bandwidth product of the spreading code. No MFG is expected for random noise, e.g., additive white Gaussian noise ("AWGN"). Thus theoretically, PG is determined by the MFG; they differ by a small amount in practice.

The DSSS approach uses code "orthogonality" to minimize interference between symbols as well as between users. The code orthogonality requires that the code sequence is almost orthogonal to any of the cyclically-shifted code sequences and to the code sequence of other users. With orthogonality, the matched filtered output yields a low side-lobe level and thus ensures minimum interference. It assures accurate symbol synchronization. However, the orthogonality of the codes is severely degraded in an underwater channel due to the rich multipaths creating inter-chip interference. To mitigate the multipath, DFE and RAKE receiver have been proposed, but both require high input-SNR and synchronization at the chip level, and are not designed for communications with low input-SNRs.

Another approach to mitigate the multipath effect is referred to as passive-phase conjugation ("PPC"), which uses a linear filter based on the estimation of the channel impulse-response. For DSSS communications, this method requires only "coarse" synchronization at the symbol level and is suitable for communications at low input-SNRs. Coarse, in this context, means imprecise, such that accuracy is of the order of several chips. The standard PPC method estimates the channel impulse-response from a probe signal transmitted before the communication packet. The standard PPC method does not work well at low input-SNRs such as around 17 kHz. Even at high input-SNRs, the PPC method fails because it does not account for the temporal variation of the channel, when the channel coherence time is significantly shorter than the packet length. The PPC method requires that the channel coherence time is approximately equal or longer than the packet length. In actuality, at high (e.g., >10 kHz) frequencies, the channel coherence time is less than 0.2 seconds, while the packet length is approximately 5-20 seconds. For underwater acoustic communications, the symbol phase is path dependent and the overall phase generally changes rapidly with time from symbol to symbol except for some specific environments (e.g., the Arctic) where the ocean remains stationary. The challenge for DSSS underwater communications is how to remove/compensate the phase fluctuations in a dynamic ocean when the phase change is non-negligible and disrupts the ability to communicate using phase-shift-keying.

It is noted that the PPC normally requires an array of receivers. Practical systems usually allow only a small number of receivers. The advantage of DSSS is that a single receiver is often sufficient. In this context, PPC is basically a matched filter, or a correlator. Since the filter uses the channel impulse-response, the method is still referred to as PPC. Obviously, the method can be applied to an array of receivers with the added benefit of minimal signal fading and reduced phase variance.

Figure 1A:
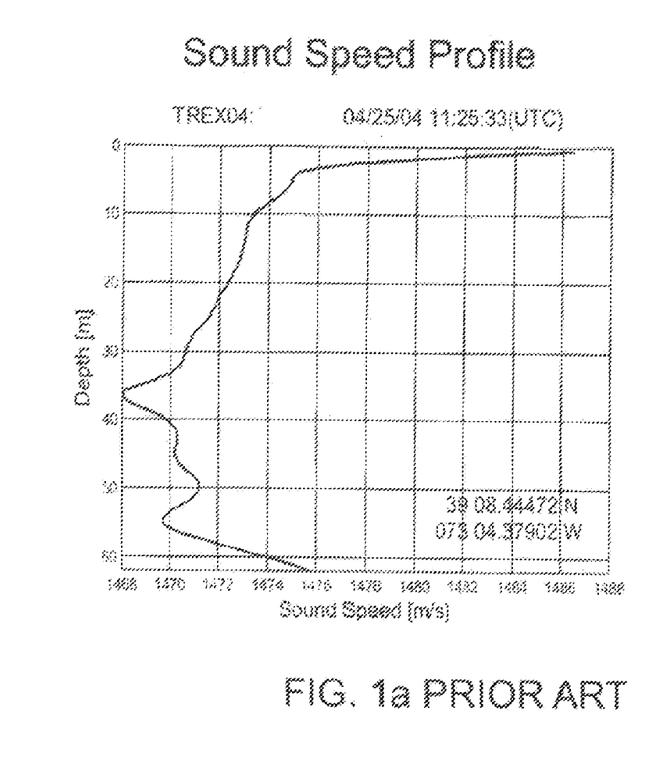
FIG. 1a is a plot of a sound speed profile as a function of depth in an acoustic channel.
Figure 1B:
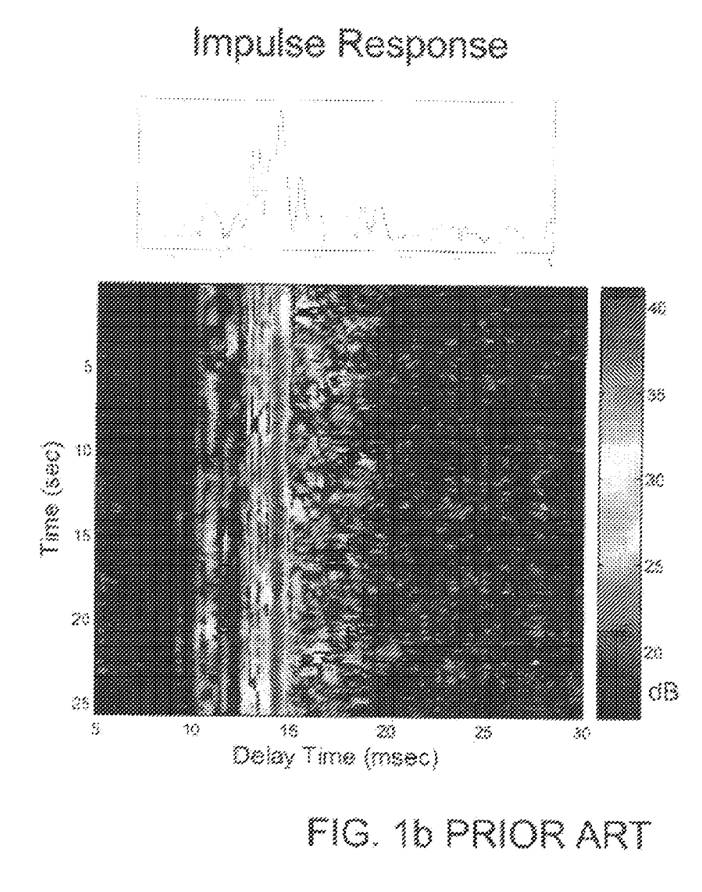
FIG. 1b is a plot of a channel impulse response as a function of time and a time-wise corresponding, linear graph of the impulse response function.
Figure 2A:
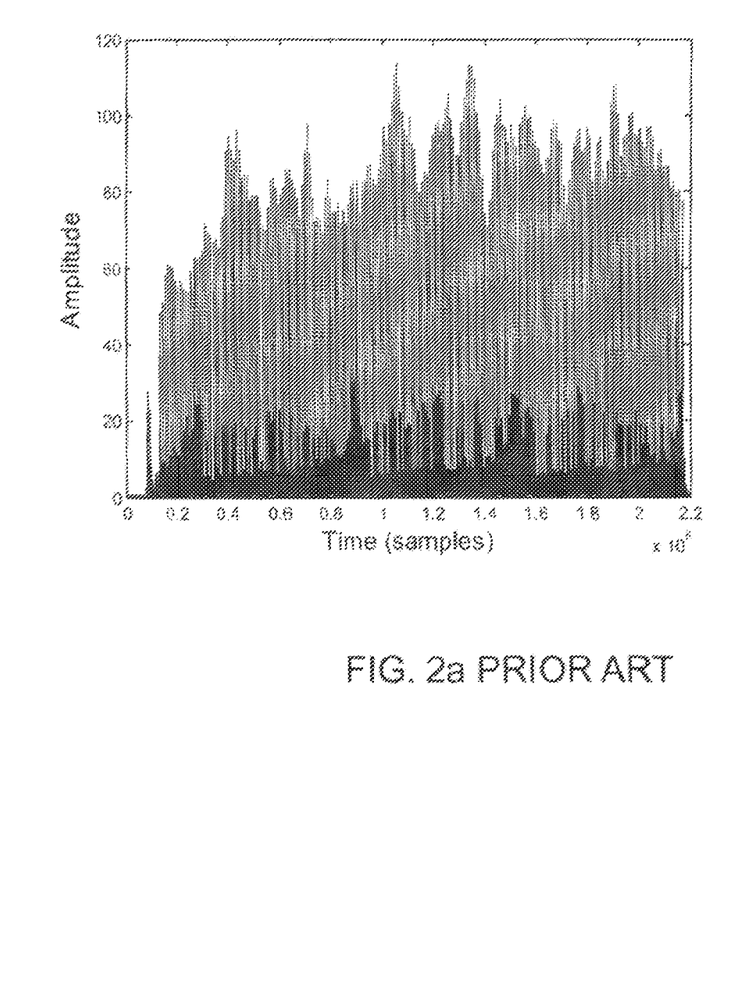
FIG. 2a is a plot of a matched filter correlator output for a packet of data.
Figure 2B:
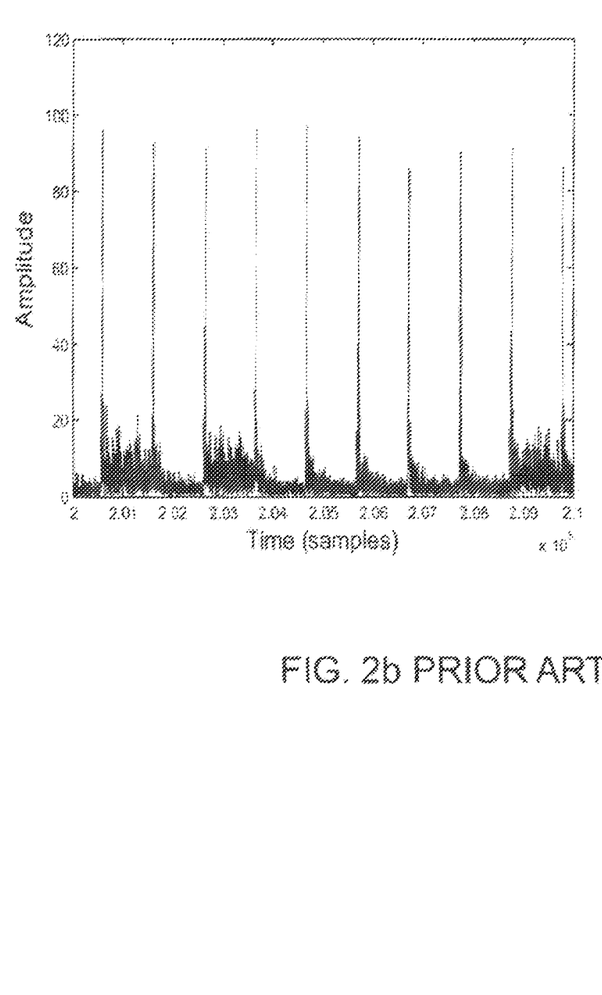
FIG. 2b is a zoom-in plot of the FIG. 2a plot.
Figure 3A:
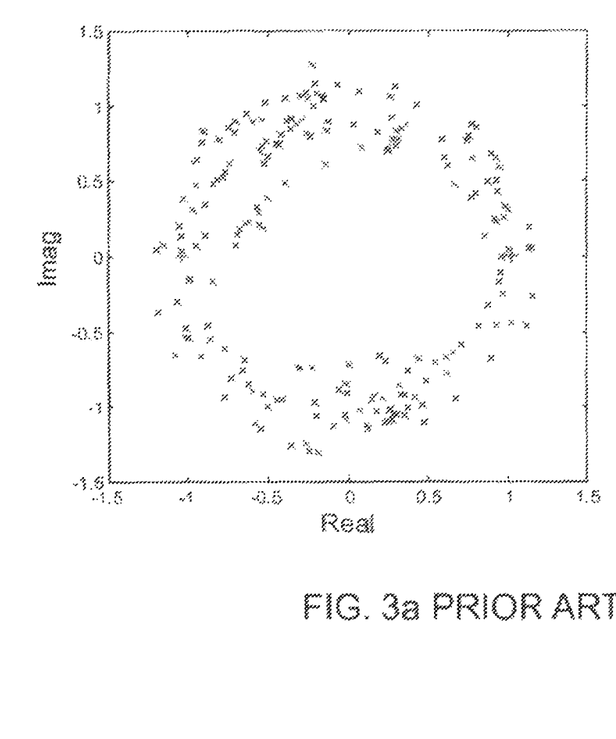
FIG. 3a is a constellation plot of the symbols using the PPC method.
Figure 3B:
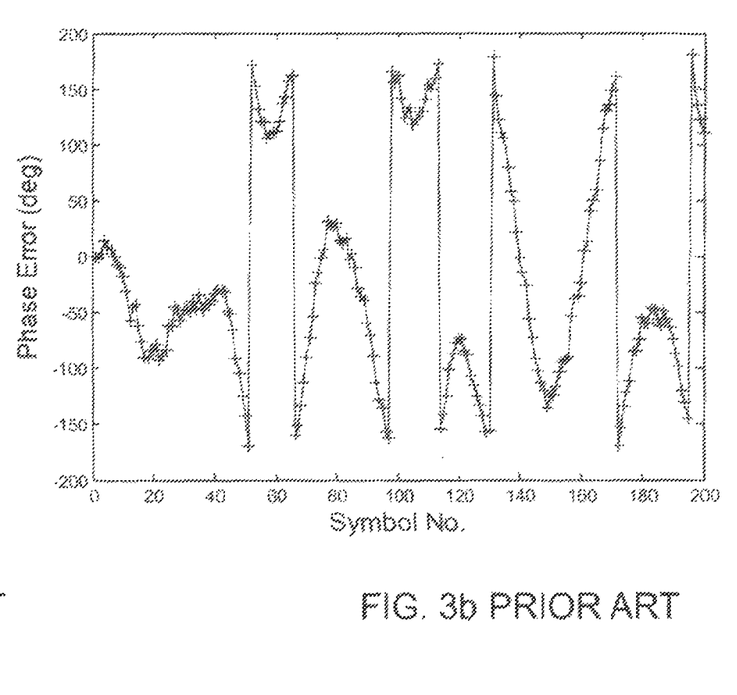
FIG. 3b is a plot of symbol phase error shown as a function of symbol number.

FIG. 3a shows the symbol-constellations-plot of the complex symbol amplitudes determined from the dominant arrival path (i.e., the peaks of the matched filter output in FIG. 2a). The true symbols are located at +1 and −1. The received symbols in FIG. 3a are unduly scattered and a large number of the symbols are in error. The phase wander is caused by the propagation medium; the symbol phases are significantly modified by the signal propagation in a time varying medium. FIG. 3b shows the phase error between the received symbols and the transmitted symbols. Symbols which have a phase error beyond ±90 degrees are in error.

In general, the symbol phase error is path-dependent, as multipaths travel through different water columns and have different path lengths. To mitigate the multipath-induced symbol distortions, a channel equalizer is needed. Using DFE jointly with a phase-locked loop ("PLL") is computationally intensive and requires a high input-SNR (e.g., normally greater than 10-15 dB).

Another method used to mitigate the multipath effect is the PPC mentioned above, also known as the passive time reversal method, which uses the channel impulse-response estimated from the probe signal, or the first symbol, as the matched filter; it can be viewed as a basic time-invariant linear equalizer. One notes that the matched filter output, FIG. 2a, can be expressed mathematically as $$r(t) = \sum_n h_n(t - nT) S_n G(t - nT) m(t) + N \quad (1)$$

where $S_n$ is the n-th transmitted symbols ($S_n = \pm 1$ for binary symbols), $h_n$ is the channel impulse associated with the n-th symbol, G is a rectangle window which is zero for $t < nT - T/2$ and $t > nT + T/2$ and N denotes the noise. In Eq. (1), m(t) is the autocorrelation function of the spreading code, which, in the ideal case, yields M (the number of chips) at the center of the correlator and one elsewhere.

The PPC processor convolves the correlator output, Eq. (1), with the time-reversed, complex-conjugated channel impulse-response estimated at t=0, denoted by $\hat{h}_0$. For simplicity (in order to illustrate the principle of the processing algorithms), the hat over $h_0$ will be dropped in the equations below, treating the estimated impulse-response as the same as the true impulse-response and leaving the channel estimation error to the numerical estimator. Using PPC, the n-th symbol is estimated from the peak of $$\hat{S}_n = \overleftarrow{h}_0^* \otimes (h_n S_n + N) = (h_0^* * h_n) S_n + N_h \quad (2)$$

where the superscript * denotes the complex conjugation, the inverse-arrow above the impulse-response denotes the time-reversal operator, $\otimes$ denotes the convolution operator and * denotes the correlation operator. Note that the convolution of a time-reversed function with another function is the same as the correlation of the function with the other function. In Eq. (2), $N_h$ denotes the filtered noise: $N_h = h_0 * N$.

The PPC filter ($h_0$) provides a means to combine the multipath arrivals of the signal coherently. For a time-invariant environment, it is expected to provide a higher gain than the incoherent RAKE receiver. For low input-SNR (e.g., around 17 KHz) data, this standard PPC method performs poorly. The symbol constellation plot and the phase error plot are basically the same as that shown in FIGS. 3a and 3b respectively except for the first 8 symbols, which have near-zero phase error. The close similarity between PPC and that based on the dominant path arrival is a manifestation of the fact that the impulse-response is dominated by one major arrival. In view of the above, Applicant concluded that for such an environment, the standard PPC does not work.

SUMMARY OF THE INVENTION

An embodiment of the invention includes a direct-sequence spread-spectrum communications method of de-spreading received data transmitted through an acoustic channel. A first code match filter is applied to received data to output a first code impulse response comprising a channel impulse response modulated by a pseudo-random number bit. A second code match filter is applied to the received data to output a second code impulse response comprising the channel impulse response modulated by a message symbol bit. The first code impulse response is correlated with the second code impulse response to output the message symbol bit modulated by the pseudo-random number bit. The pseudo-random number bit is eliminated to identify the message symbol bit, thereby decoding the message symbol bit from the received data. Optionally, the eliminating the pseudo-random number bit to identify the message symbol bit includes using binary phase shift keying symbol estimation to identify the message symbol bit.

Another embodiment of the invention includes a direct-sequence spread-spectrum communications method of de-spreading received data transmitted through an acoustic channel. A match filter is applied to received data to output a first channel impulse response comprising a code impulse function modulated by a first symbol bit, and a second channel impulse response comprising the code impulse function modulated by a second symbol bit. The first channel impulse response is correlated with the second channel impulse response to output an intersymbol product comprising a conjugate of the first symbol bit and the second symbol bit. The differential phase shift of the intersymbol product is determined to identify a message symbol bit, thereby decoding the message symbol bit from the received data.

Another embodiment of the invention includes a direct-sequence spread-spectrum communications method of de-spreading received data transmitted through an acoustic channel. A first transition code match filter is applied to received data to output a first transition code impulse response. A second transition code match filter is applied to received data to output a second transition code impulse response. Whether an energy at a time period for the first transition code impulse response is greater than an energy at the time period for the second transition code impulse response is determined so as to identify a message symbol bit, thereby decoding the message symbol bit from the received data. Optionally, the determining whether an energy at a time period for the first transition code impulse response is greater than an energy at the time period for the second transition code impulse response so as to identify a message symbol bit includes using binary phase shift keying to identify the message symbol bit.

BRIEF DESCRIPTION OF THE DRAWINGS

FIG. 11a is a plot of a bit error rate of 1130 packets as a function of input signal to noise using the third method of embodiment described below. Solid is model prediction with signal fading as shown in FIG. 9a.

FIG. 11b is a plot of average bit error rate as a function of input signal to noise.

DETAILED DESCRIPTION OF THE INVENTION

Applicant determined that the poor performance of the PPC method is due to the fact that the PPC filter is time invariant, and does not account for the rapid channel variation seen in the data. The phase error is due to the fact that $h_o**h_n$ is not real and has a phase term when the channel changes rapidly with time.

Figure 4:
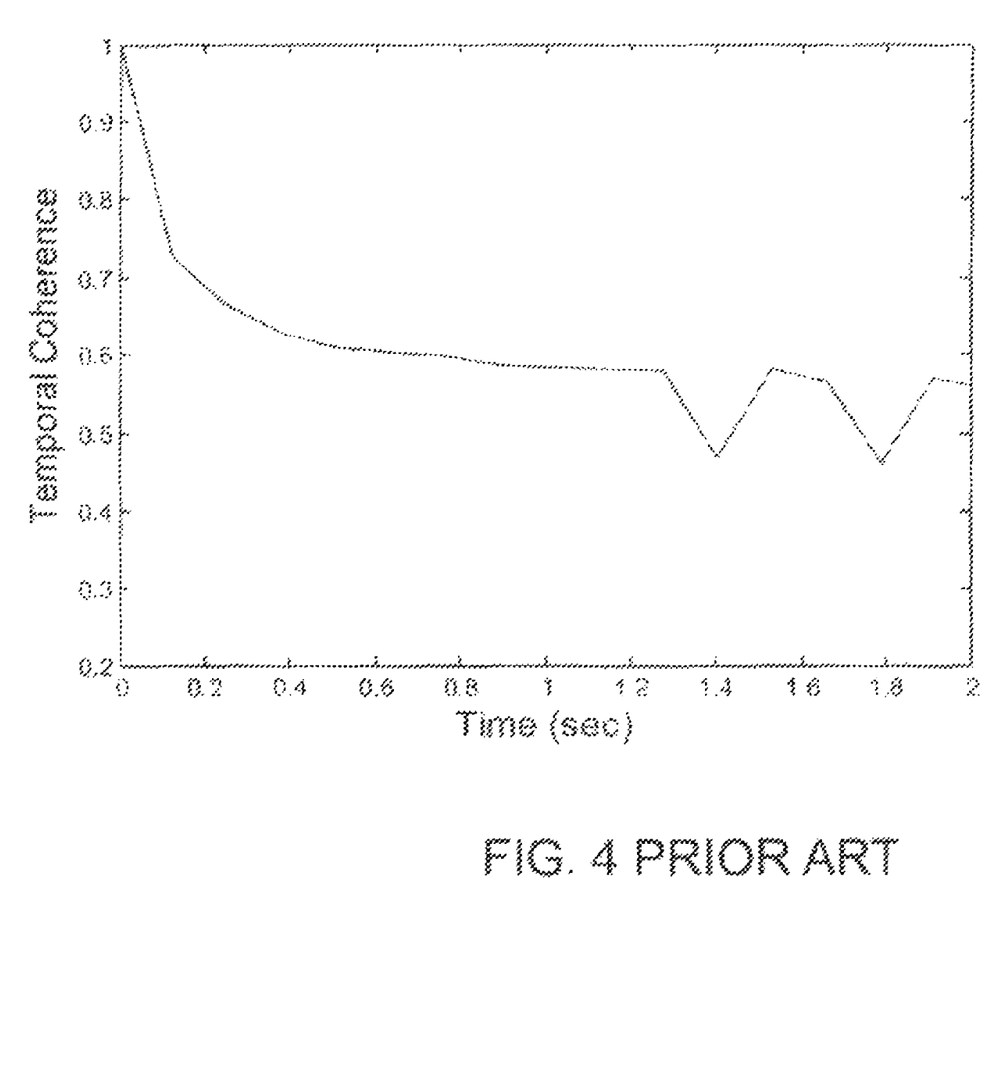
FIG. 4 is a plot of intra-packet temporal coherence of the channel impulse responses averaged over an illustrative 116 packets.

How fast the channel fluctuates can be measured in terms of the signal temporal coherence, which is shown in FIG. 4. The temporal coherence of a broadband signal is obtained by correlating the impulse-response at a reference time with the impulse-response following the reference time with a delay time. The correlation averaged over the reference time is plotted in FIG. 4. FIG. 4 shows that the signal temporal coherence drops to below 0.6 in 1-2 sec, suggesting that the channel coherence time is of the order of 1 sec (or 8 symbols).

Applicant determined that to improve the bit error rate ("BER") (using PPC), one needs to process the data using a time-dependent channel impulse-response function or a time-dependent equalizer. Using the channel impulse at t=nT, the symbol is estimated from the peak of $$\hat{S}_n = (h_nh_n)S_n + h_nN = (h_n**h_n)S_n + N_{h,n}. \quad (3)$$

Since $h_nh_n$ is the autocorrelation function of the channel impulse-response and is real, the symbol can be properly decoded from the phase of the $\hat{S}_n$ by determining the peak of its absolute value. In the case, the error comes entirely from the noise, and the BER, plotted as a function of the symbol energy ($E_b$) over the noise spectral density ($N_0$), should agree with the BER of a BPSK signal in free space in the presence of AWGN. Note that $N_{h,n}=h_nN$ is also white temporally. Thus, if the channel impulse-response is known as a function of time, one can extend the PPC algorithm to include the time-varying channel impulse-response. The data are divided into blocks. Each block is matched filtered with the channel impulse-response for that block time period. This general method is termed herein as a time-updated PPC. It is a channel-estimation-based PPC. In practice, this channel-estimation-based PPC method is performed without explicitly estimating the channel impulse response. Three illustrative embodiments of practical methods are discussed below.

A first method embodiment of the invention includes a direct-sequence spread-spectrum communications method of de-spreading received data transmitted through an acoustic channel. The first method embodiment is generally described as follows with respect to FIG. 5. A direct-sequence spread-spectrum communications system includes a transmitter 5 communicating with a receiver 10 via an acoustic channel 15. The acoustic channel 15, for instance, includes an underwater acoustic channel such as a region in an ocean. The acoustic channel 15, for instance, includes an urban environment with many buildings that cause acoustic multi-paths. A message, including message bits, is spread with a second code. Pseudo-random noise is spread with a first code. The output of each is added and transmitted by the transmitter through the acoustic channel 15. Received data is received by the receiver 10 via the acoustic channel 15 and processed at the receiver. A first code match filter is applied to received data to output a first code impulse response comprising a channel impulse response modulated by a pseudo-random number bit. A second code match filter is applied to the received data to output a second code impulse response comprising the channel impulse response modulated by a message symbol bit. The first code impulse response is correlated with the second code impulse response to output the message symbol bit modulated by the pseudo-random number bit. The pseudo-random number bit is eliminated to identify the message symbol bit, thereby de-spreading the message symbol bit from the received data. Optionally, the eliminating the pseudo-random number bit to identify the message symbol bit includes using binary phase shift keying symbol estimation to identify the message symbol bit.

Figure 6:
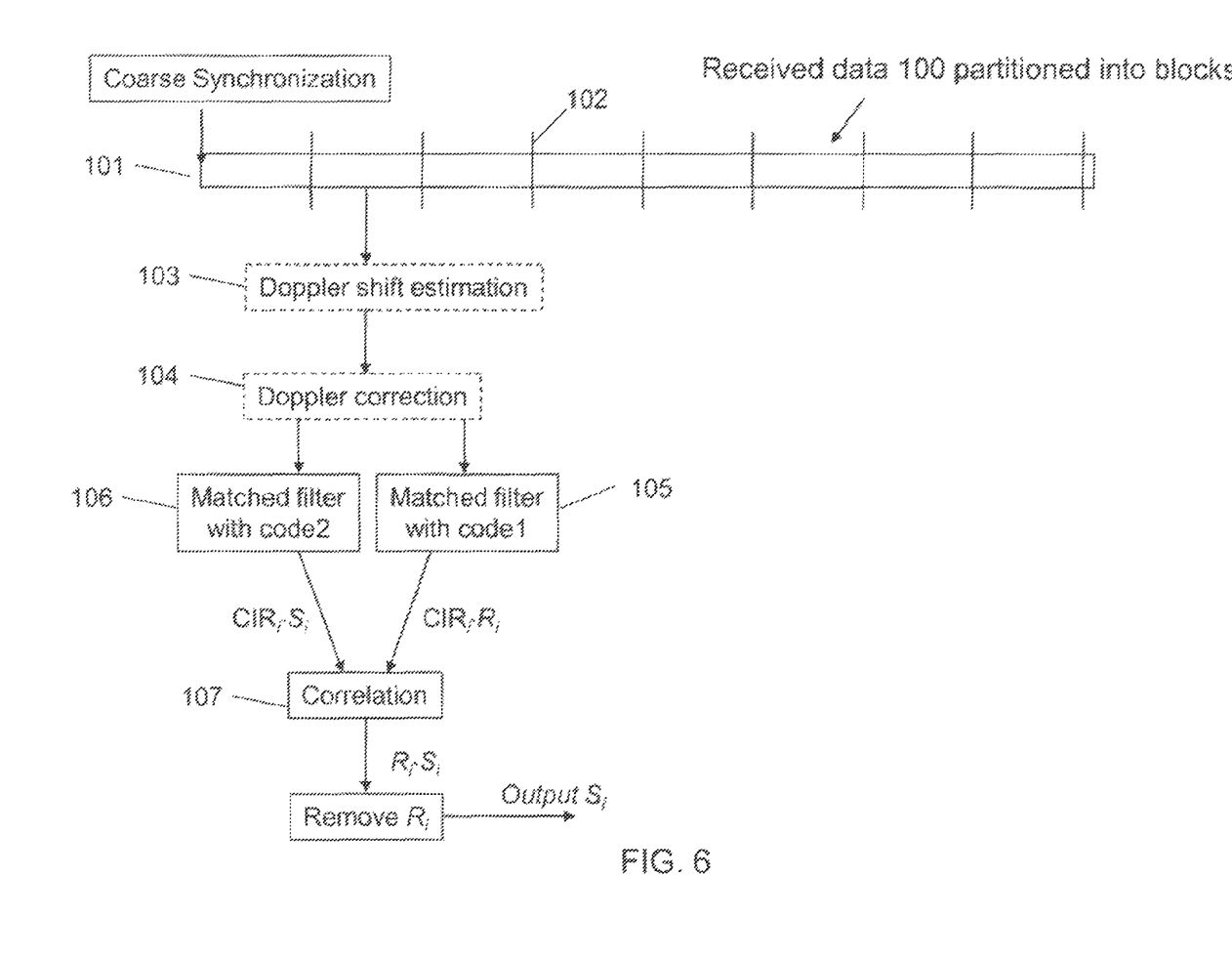
FIG. 6 is a data processing block diagram consistent with a first method embodiment of the invention.
Figure 7A:
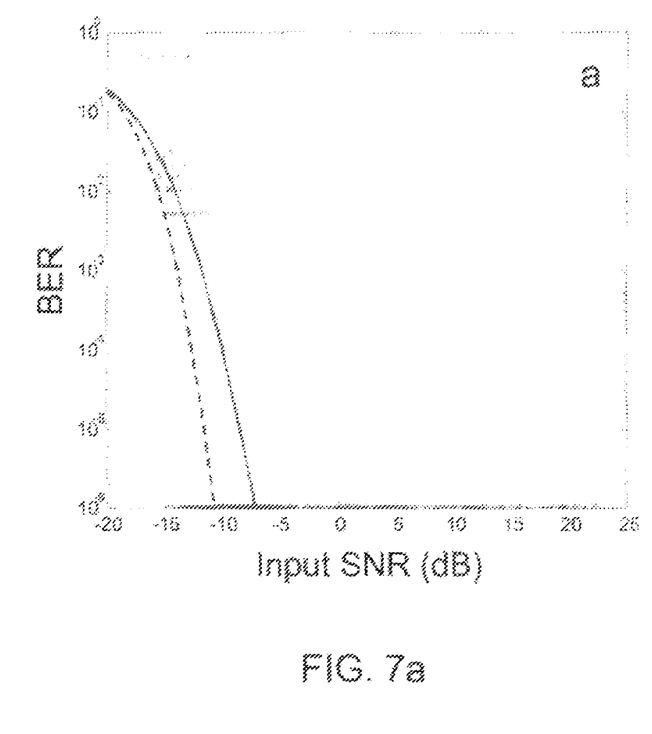
FIG. 7a is a plot of a bit error rate of 1160 packets as a function of input signal to noise, using the first method embodiment described below, wherein solid and dashed lines are model predictions for this method embodiment with and without signal fading.
Figure 7B:
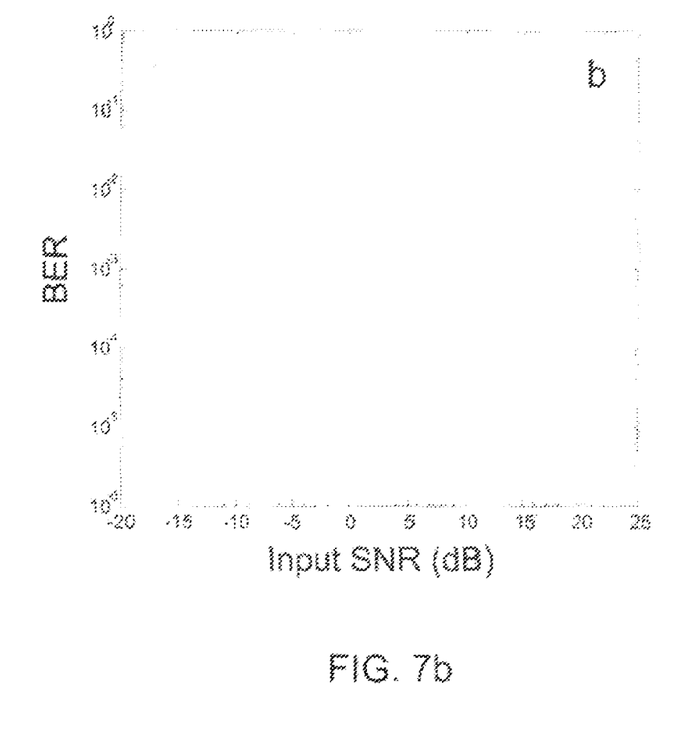
FIG. 7b is a plot of average bit error rate as a function of input signal to noise.

The first method embodiment, shown by way of example in FIG. 6, is more particularly described by way of illustration as follows. The first illustrative method embodiment uses a pilot signal which is transmitted concurrently with the acoustic communication signal. An example of the pilot signal will be a Gaussian white-noise like signal or a pseudorandom BPSK signals with a code sequence that is almost orthogonal to the code sequence used for communications. Using a Gaussian-random pilot signal, a low-level communication can be transmitted using the pilot signal as a cover and is thus undetectable without a prior warning. Symbol synchronization 101 is done by matched filtering the data with the code of the pilot signal and determining the peak of the matched filter output. The received data 100 is then partitioned with partitions 102 into blocks according to the symbol length. For moving platforms, Doppler shift is optionally estimated using a wide band ambiguity function 103, which correlates the Doppler-shift code sequence with data; the peak of the ambiguity surfaces determines the Doppler-shift. The data are then Doppler-corrected. If each block encounters a different Doppler-shift, the above processing is applied to each block of data. A first code match filter 105 is applied to received data to output a first code impulse response comprising a channel impulse response modulated by a pseudo-random number bit, $R_i$. A second code match filter 106 is applied to the received data to output a second code impulse response comprising the channel impulse response modulated by a message symbol bit $S_i$. The first code impulse response is correlated with the second code impulse response to output the message symbol bit modulated by the pseudo-random number bit $R_i^* S_i$. Using illustrative data, the resulting uncoded BER using this method is plotted in FIG. 7a as a function of the input-SNR at the receiver. The average BER as a function of input-SNR is shown in FIG. 7b. One finds that the average BER is less than 1% for input-SNR as low as −14 dB. All packets are error free for input-SNR >−10 dB. A substantial number of packets (>40%) are error free even at input-SNR as low as −14 dB.

Figure 5:
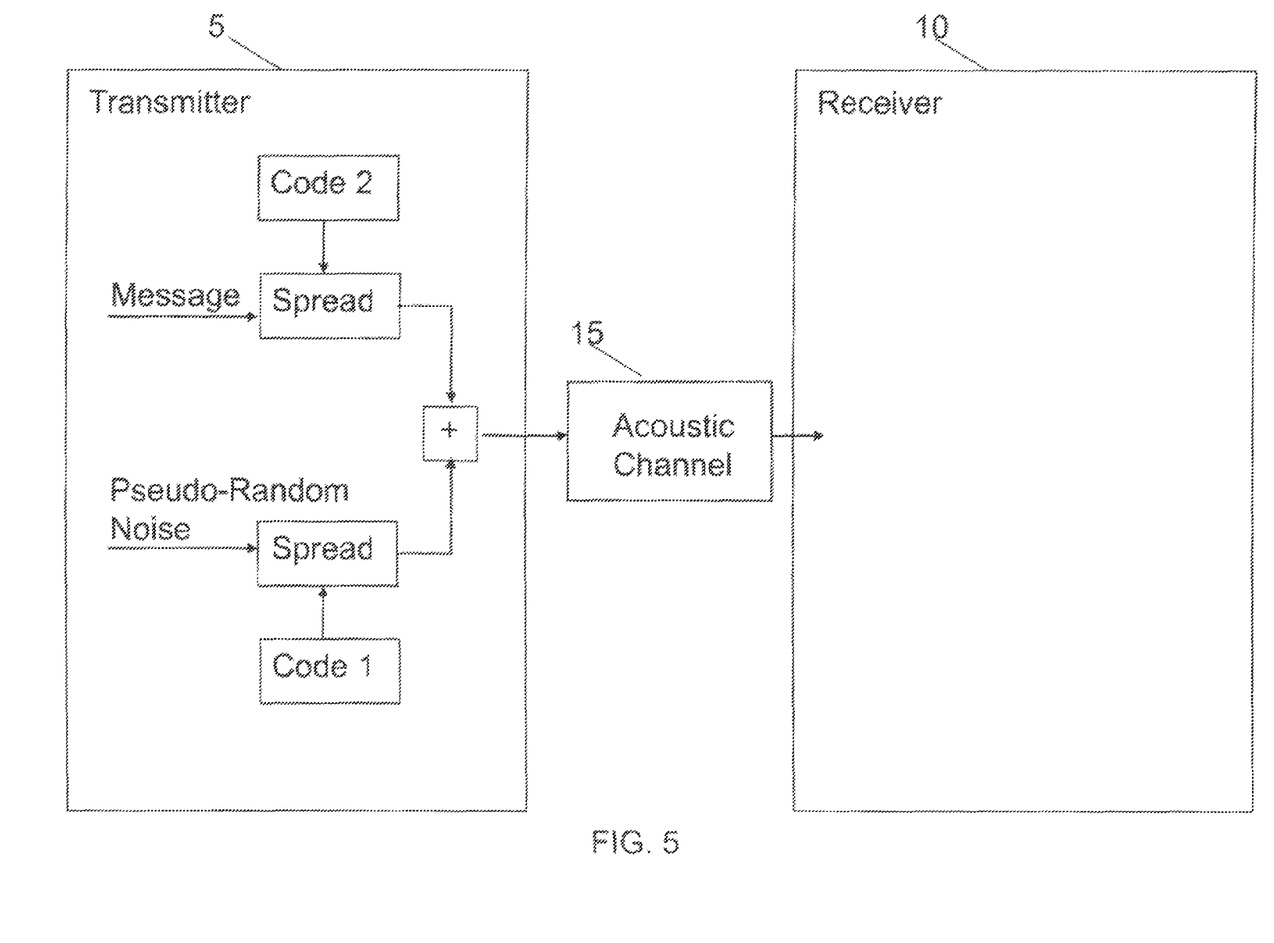
FIG. 5 is a block diagram of a communications system consistent with an embodiment of the invention.

In some applications, it is convenient to use A second method embodiment as described below, which correlates the matched filter outputs of two consecutive symbols to estimate the differential phase (or relative sign) between the symbols. It can be easily applied to communication signals with low SNRs to achieve LPI/LPD. The advantage here is that no pilot signal is needed. A second method embodiment of the invention includes a direct-sequence spread-spectrum communications method of de-spreading received data transmitted through an acoustic channel. The second method embodiment is described generally as follows. A transmitter for use with this second method embodiment includes only the message data as shown in FIG. 5; no pseudo-random noise is used. On the receiver side, a match filter is applied to received data to output a first channel impulse response comprising a code impulse function modulated by a first symbol bit, and a second channel impulse response comprising the code impulse function modulated by a second symbol bit. The first channel impulse response is correlated with the second channel impulse response to output an intersymbol product comprising a conjugate of the first symbol bit and the second symbol bit. The differential phase shift of the intersymbol product is determined to identify a message symbol bit, thereby de-spreading the message symbol bit from the received data.

Figure 8:
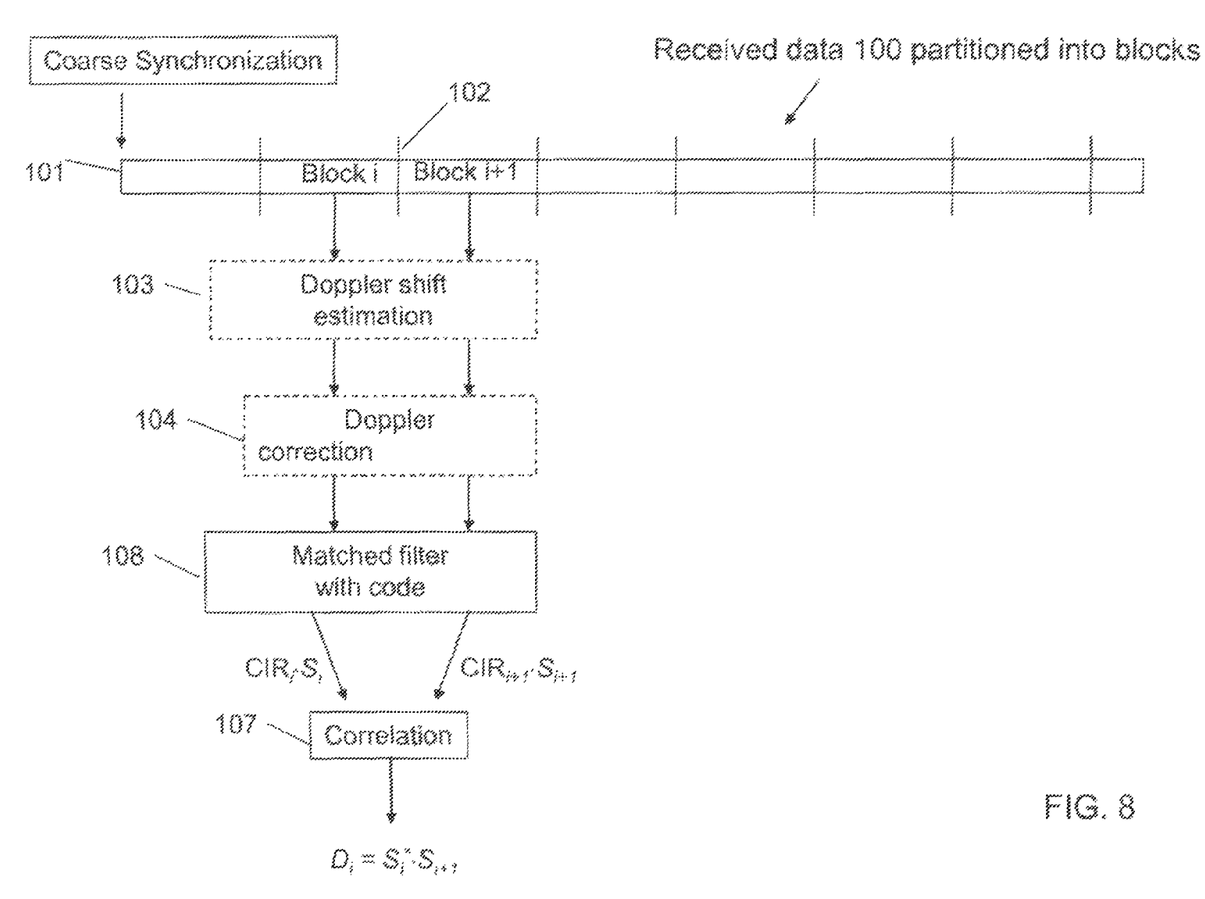
FIG. 8 is a data flow diagram consistent with a second method embodiment of the invention.

The second method embodiment, shown by way of example in FIG. 8, is more particularly described by way of illustration as follows. In FIG. 8, the data is synchronized 101 using the code sequence. Doppler-correction 104 is applied to the data if needed. A match filter 108 is applied to received data to output a first channel impulse response comprising a code impulse function, $CIR_i$, modulated by a first symbol bit $S_i$, and a second channel impulse response comprising the code impulse function, $CIR_{i+1}$, modulated by a second symbol bit $S_{i+1}$. The first channel impulse response is correlated with the second channel impulse response to output an intersymbol product comprising a conjugate of the first symbol bit and the second symbol bit $S_i^* S_{i+1}$. The differential phase shift of the intersymbol product is determined to identify a message symbol bit, thereby de-spreading the message symbol bit from the received data.

The processor output is given by $$\hat{D}_n = (h_n^* S_n^* + N_n^*) * (h_{n+1} S_{n+1} + N_{n+1}) \quad (4)$$
$$= h_n^* * h_{n+1} S_n^* S_{n+1} + N_n^* * h_{n+1} S_{n+1} + h_n^* * N_{n+1} S_n^* + N_n^* * N_{n+1},$$

where one expects $h_n^{}h_{n+1} \approx 1$ if the channel hasn't changed much during a two-symbol period, and $|h_n^{}h_{n+1}| > |N_n^{**}h_{n+1}|$. Under the circumstances, the peak of the correlation (the right hand side) can be used to determine the symbol $\hat{D}_n$. For DPSK, the transmitted symbol $S_n$ is related to the data symbol $D_n$ by $$S_n = D_n S_{n-1} \text{ for } n > 1 \quad (5)$$

with $S_1 = 1$.

Figure 9A:
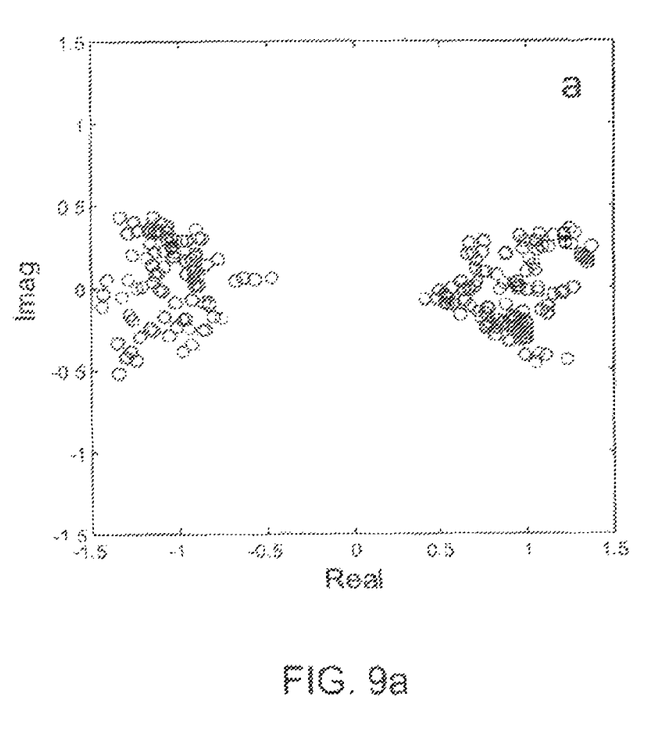
FIG. 9a is a constellation plot of the symbols, using the second method embodiment, wherein solid and dashed lines are model predictions for this method embodiment with and without signal fading.
Figure 9B:
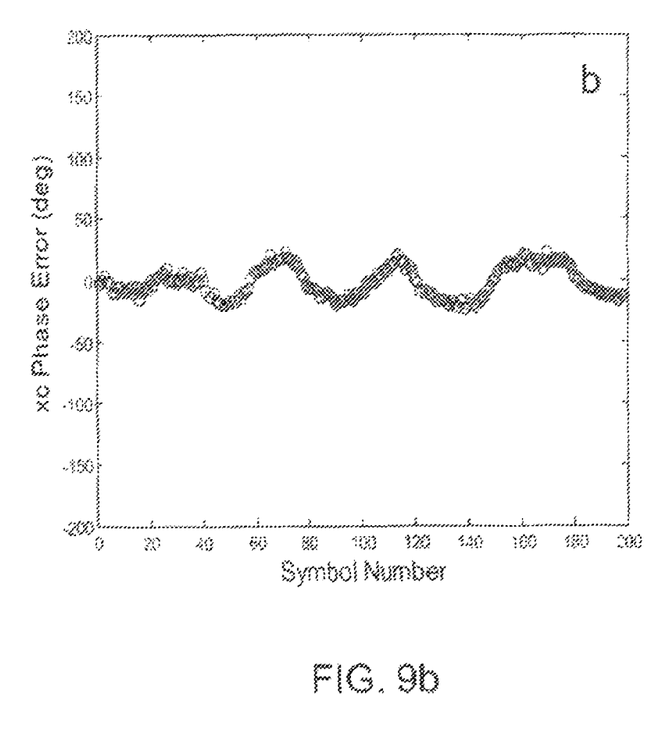
FIG. 9b is a plot of symbol phase error shown as a function of symbol number, using the second method embodiment.

Using the second method embodiment, the symbol constellation for the DPSK signal and the (differential) symbol phase error are plotted in FIG. 9a and FIG. 9b respectively as a function of the symbol number for the same packet of data analyzed in FIG. 3. One observes that compared with FIG. 3b, the phase error is significantly reduced. All symbols are correctly determined. The differential-phase error is the error of the differential-phase of symbols between data and transmitted signal. As discussed above, the phase of the peak of the correlation yields the differential phase between the previous and current symbol. After removing the true differential phase between the two symbols from the transmitted data, one obtains the differential phase error between the two symbols.

The second method embodiment of the invention yields a simple way to estimate the symbol differential phase error without requiring a channel equalizer. Note that the symbol duration is ~128 msec. The small differential phase error suggests that one could track and correct the symbol phase error of a BPSK signal using a phase-locked loop ("PLL") in an alternative embodiment. For practical reasons, it is much simpler to use DSPK signaling without requiring the PLL.

For DPSK signals, whenever the differential-phase error of the symbol exceeds ±90°, the symbol will be in error. Using this method embodiment, a high percentage of the symbols could be in error when applied to moving source data. To reduce the bit error, one needs multiple receivers as the variance of the phase errors decreases with increasing number of receivers. The alternative is to use the third method of embodiment of the invention for moving sources/receivers.

A third method embodiment of the invention includes a direct-sequence spread-spectrum communications method of de-spreading received data transmitted through an acoustic channel. The third method embodiment is described generally as follows. A transmitter for use with the third method embodiment includes only the message data of FIG. 5; no pseudo-random noise is used. On the receiver side, a first transition code match filter is applied to received data to output a first transition code impulse response. A second transition code match filter is applied to received data to output a second transition code impulse response. Whether an energy at a time period for the first transition code impulse response is greater than an energy at the time period for the second transition code impulse response is determined so as to identify a message symbol bit, thereby decoding the message symbol bit from the received data. Optionally, the determining whether an energy at a time period for the first transition code impulse response is greater than an energy at the time period for the second transition code impulse response so as to identify a message symbol bit includes using binary phase shift keying to identify the message symbol bit.

Note that in a time-invariant environment without multipaths, one can detect the phase change between symbols using a pair of code sequences $$T_+ = [C, C] \text{ and } T_- = [C, -C] \quad (6)$$

where C is the code sequence expressed as a row vector. The data, after proper synchronization and Doppler correction, is divided into blocks. The data blocks containing two symbols can be expressed as $$d = [s_n C e^{i\theta_n}, s_{n+1} C e^{i\theta_{n+1}}] \quad (7)$$

where $s_n$ is the nth symbol, $s_n = \pm 1$, and $\theta$ is the random symbol phase. The matched filter output between Eq. (6) and Eq. (7) yields $$T_+^* d = (s_n e^{i\theta_n} + s_{n+1} e^{i\theta_{n+1}}) \rho$$

$$T_-^* d = (s_n e^{i\theta_n} - s_{n+1} e^{i\theta_{n+1}}) \rho \quad (8)$$

where ρ is the auto-correlation function of the code sequence. Without differential-phase error, i.e., $\theta_n=\theta_{n+1}$, one finds $\max|T_+^*d|^2>\max|T_-^*d|^2$, if $s_n \cdot s_{n+1}=1$ (adjacent symbols remain the same, no transition), and $\max|T_-^*d|^2>\max|T_+^*d|^2$, if $s_n \cdot s_{n+1}=-1$ (adjacent symbol not the same). Thus by comparing the outputs of the matched filter, Eq. (8), one can determine the next symbol based on current symbol. However, one notes that this simple method does not work when there is significant differential-phase error. An example is an underwater acoustic channel involving a moving source/receiver. The point is that the matched filter output is still phase dependent.

The third method embodiment uses energy detectors which do not involve the differential phase error. A new pair of transition detector is proposed which is not sensitive to the differential-phase error. Expressing the code sequence as two parts: $C=[C_1, C_2]$, the new transition detectors are given by $$C_P=[C_2,C_1], \text{ and } C_N=[C_2,-C_1] \quad (9)$$

The new transition detector works in a similar manner as the matched filter described above. In a multipath, time varying environment, the data of Eq. (7) can be expressed in four half-blocks as $$d=[s_n h_n C_1, s_n h_{n+1/2} C_2, s_{n+1} h_{n+1} C_1, s_{n+1} h_{n+1+1/2} C_2] \quad (10)$$

where $h_n$ is the impulse response at $t_n$, and $h_{n+1/2}$ is the impulse response at $t_n+\tau/2$; $\tau$ is the symbol duration. The regular matched filter using the code sequence C yields, $$C^*d=[s_n \bar{h}_n \rho, s_{n+1} \bar{h}_{n+1} \rho], \quad (11)$$

where $\bar{h}_n$ represents the mean channel impulse response of $[h_n, h_{n+1/2}]$, the impulse response of the symbol. The correlation of the matched filter outputs between the two symbols (as in the second method embodiment described above) yields $$(s_n^* s_{n+1})(\bar{h}_n^{**}\bar{h}_{n+1})\rho^2=(s_n^* s_{n+1})|\bar{h}_n^*\bar{h}_{n+1}|e^{i\theta_{n+1}}\rho^2, \quad (12)$$

where φ is the differential-phase between the two symbols due to the random medium, which causes the differential-phase error. The above equations assume that the channel impulse response can be assumed as quasi-stationary within a symbol time frame.

The new transition filter works by the same principle as the matched filter, Eq. (11).

$$C_\pm^* \bar{d}=\bar{h}_{n+1/2} C_\pm^* [s_n C_2, s_{n+1} C_1], \quad (13)$$

where $\bar{d}$ contains two half-blocks of data, $$\bar{d}=[s_n h_{n+1/2} C_2, s_{n+1} h_{n+1} C_1].$$

Now if $s_n=s_{n+1}$, one has $$\max|C_\pm * \bar{d}|^2 = |s_n \bar{h}_{n+1/2}|^2 (\max|C_\pm * C_+|)^2 = |\bar{h}_{n+1/2}|^2 \begin{bmatrix} M^2 \\ \beta^2 \end{bmatrix}, \quad (14)$$

and if $s_n=-s_{n+1}$, one has $$\max|C_\pm * \bar{d}|^2 = |s_n \bar{h}_{n+1/2}|^2 (\max|C_\pm * C_-|)^2 = |\bar{h}_{n+1/2}|^2 \begin{bmatrix} \beta^2 \\ M^2 \end{bmatrix}, \quad (15)$$

where one notes that the auto-correlation function of $C_+$ is the same as the auto-correlation function of C itself; it has a peak value equal to the length of the code sequence, M, and a sidelobe level equal to 1. The correlation of $C_-$ against itself has a peak value equal to the length of the code sequence and a sidelobe level that varies depending on the sequence; normally close to 1. The correlation of $C_+$ against $C_-$ has peak value β much less than M; the actual value depends on the sequence used. Since M>>β in theory, the matched filter outputs, Eqs. (14) and (15) can be used to determine whether the adjacent symbols are the same or not (whether the relative phase of the adjacent symbols is zero or 180°).

Figure 10A:
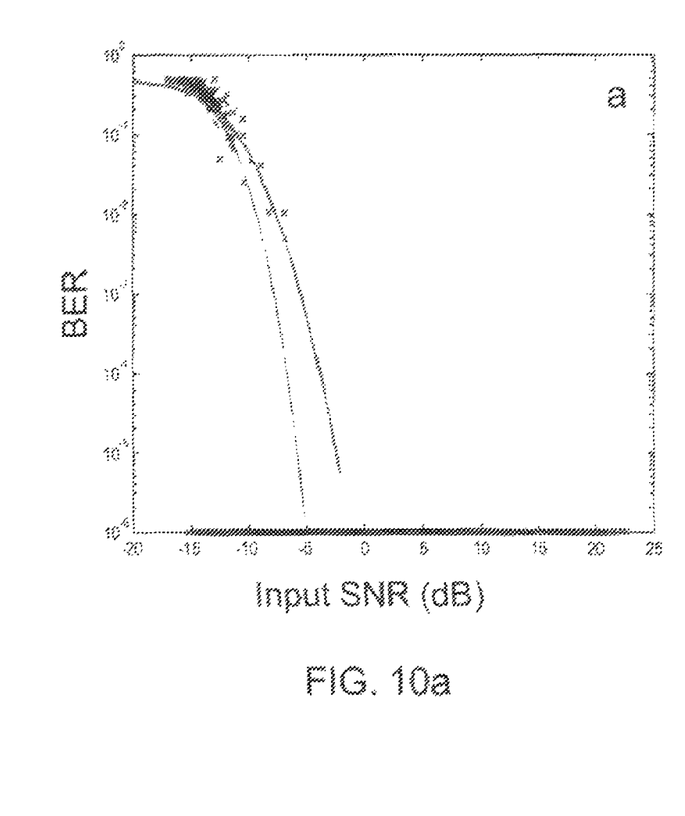
FIG. 10 is a data flow diagram consistent with a third method embodiment of the invention.
Figure 10B:
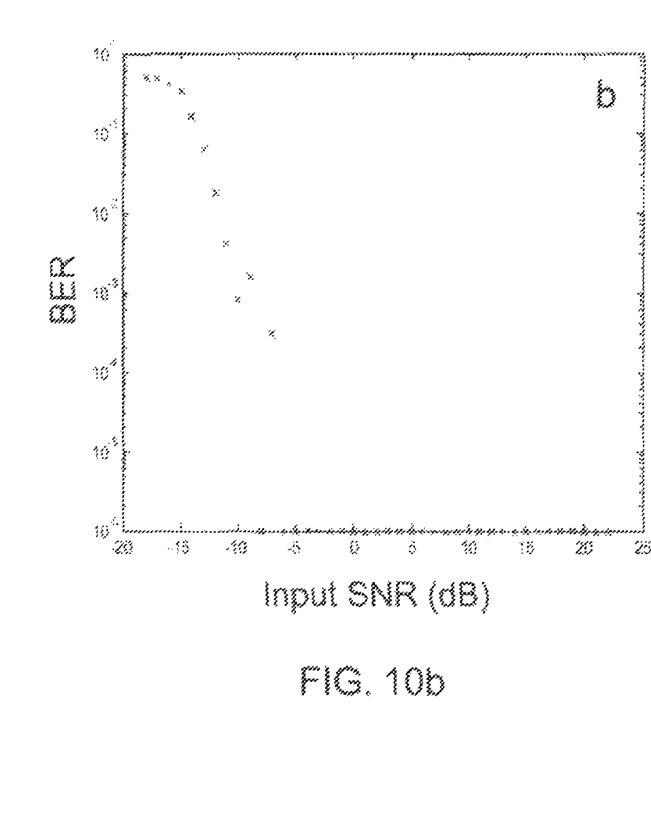

The third method embodiment, shown by way of example in FIG. 10, is more particularly described by way of illustration as follows.

Figure 11:
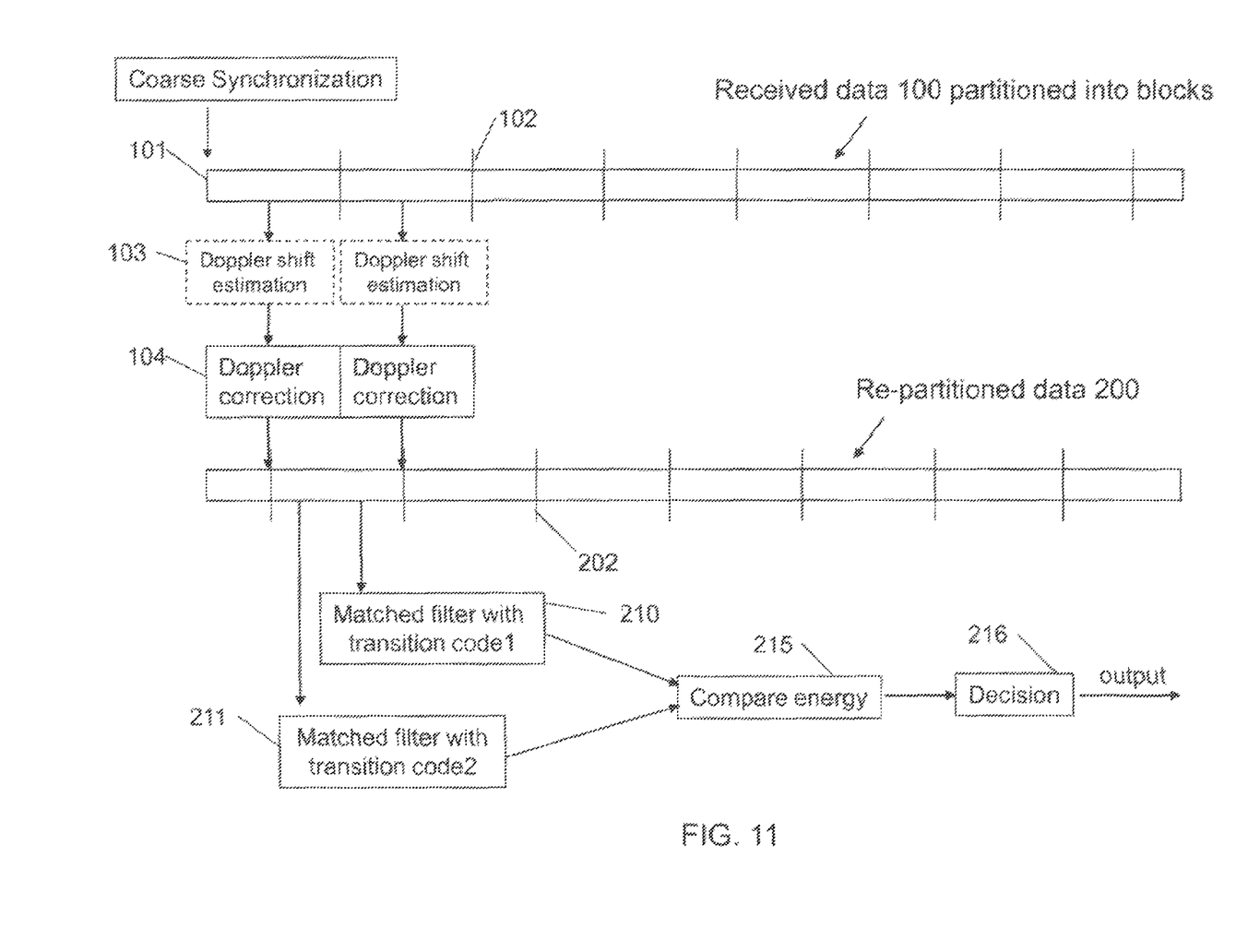
Figure 12A:
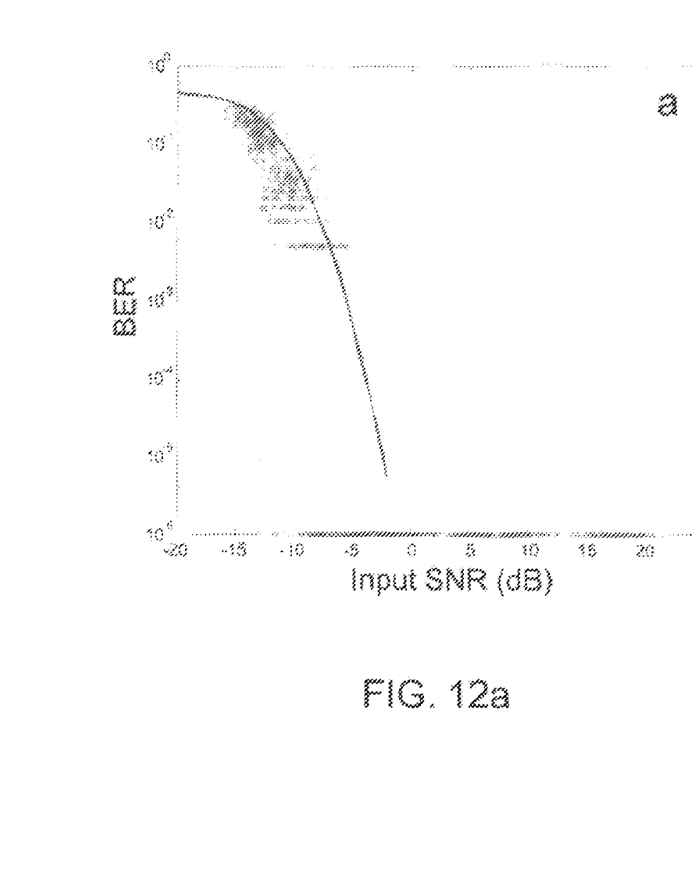
Figure 12B:
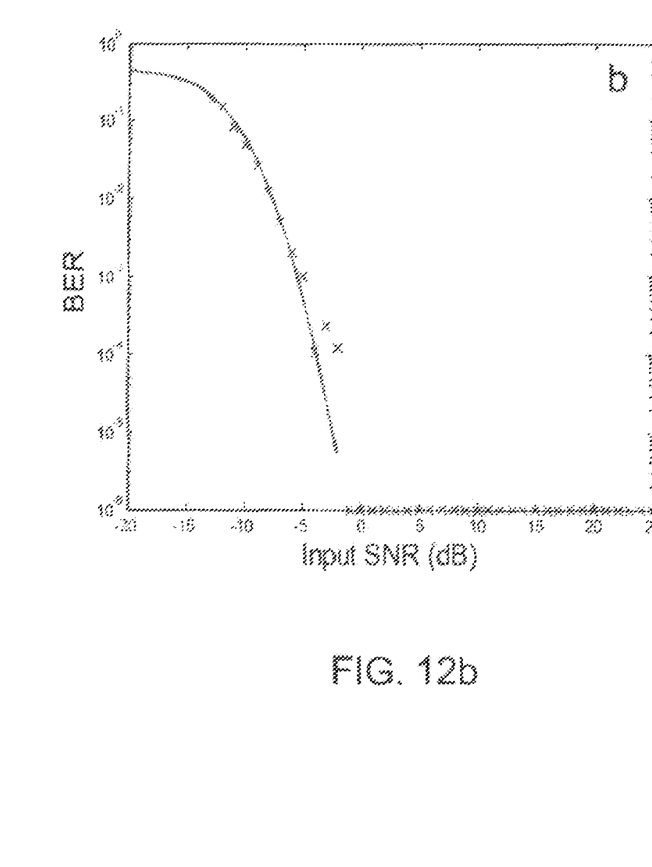

Referring to FIG. 11, the data is synchronized 101 using the code sequence and Doppler-corrected 104 using the wide band ambiguity function. A first transition code match filter, $C_+$, is applied 210 to re-partitioned data 200 to output a first transition code impulse response. A second transition code match filter, $C_-$, is applied 211 to re-partitioned data 200 to output a second transition code impulse response. For a given symbol, the energy of the two matched filter outputs is compared 215. If the energy of the first transition code impulse response is larger than that of the second transition code impulse response, a decision 216 is made that the two symbols are of the same kind. If the energy of the first transition code impulse response is less than that of the second transition code impulse response, a decision 216 is made that the two symbols are of the opposite kind. The differential phase between the two adjacent symbols are then determined. Optionally, the determining whether an energy at a time period for the first transition code impulse response is greater than an energy at the time period for the second transition code impulse response so as to identify a message symbol bit includes using binary phase shift keying to identify the message symbol bit.

Optionally, at least a portion of a method embodiment according to the instant invention is capable of being implemented in computer program procedures stored on a standard computer-readable medium and executed on a standard computer or network of computers. To reduce the computational load, the received data are optionally processed in the base band and decimated to, for example, two samples per chip.

The many features and advantages of the invention are apparent from the detailed specification, and thus, it is intended by the appended claims to cover all such features and advantages of the invention which fall within the true scope and spirit of the invention. Further, because numerous modifications and variations will readily occur to those skilled in the art, it is not desired to limit the invention to the exact construction and operation as illustrated and described, and accordingly, all suitable modifications and equivalents may be resorted to, falling within the scope of the invention.

What is claimed is:

1. A direct-sequence spread-spectrum communications method of de-spreading and decoding received data transmitted through an acoustic channel comprising:
   applying a first code match filter to de-spread the received data to output a first code impulse response comprising a channel impulse response modulated by a pseudo-random number bit;
   applying a second code match filter to de-spread the received data to output a second code impulse response comprising the channel impulse response modulated by a message symbol bit;
   correlating the first code impulse response with the second code impulse response to output the message symbol bit modulated by the pseudo-random number bit; and eliminating the pseudo-random number bit to identify the message symbol bit, thereby decoding the message symbol bit from the received data.

2. The method according to claim 1, wherein said eliminating the pseudo-random number bit to identify the message symbol bit comprises using binary phase shift keying symbol estimation to identify the message symbol bit.

3. A direct-sequence spread-spectrum communications method of de-spreading and decoding received data transmitted through an acoustic channel comprising:
- applying a match filter to de-spread the received data to output a first channel impulse response comprising a code impulse function modulated by a first symbol bit, and a second channel impulse response comprising the code impulse function modulated by a second symbol bit;
- correlating the first channel impulse response with the second channel impulse response to output an intersymbol product comprising a conjugate of the first symbol bit and the second symbol bit; and
- determining a differential phase shift of the intersymbol product to identify a message symbol bit, thereby decoding the message symbol bit from the received data.

4. A direct-sequence spread-spectrum communications method of de-spreading received data transmitted through an acoustic channel comprising:
- applying a first transition code match filter to de-spread the received data to output a first transition code impulse response;
- applying a second transition code match filter to de-spread the received data to output a second transition code impulse response;
- determining whether an energy at a time period for the first transition code impulse response is greater than an energy at the time period for the second transition code impulse response so as to identify a message symbol bit, thereby de-spreading the message symbol bit from the received data.

5. The method according to claim 4, wherein determining whether an energy at a time period for the first transition code impulse response is greater than an energy at the time period for the second transition code impulse response so as to identify a message symbol bit comprises using binary phase shift keying to identify the message symbol bit.

* * * * *